United States Patent [19]
Fortune et al.

[11] Patent Number: 4,759,895
[45] Date of Patent: Jul. 26, 1988

[54] TEMPERATURE MEASURING APPARATUS

[76] Inventors: William S. Fortune, 29866 Cuthbert Rd., Malibu, Calif. 90265; Paul Y. Takayesu, 16257 Minnihaha St., Granada Hills, Calif. 91344

[21] Appl. No.: 822,146

[22] Filed: Jan. 24, 1986

[51] Int. Cl.$^4$ .............................................. G01K 7/04
[52] U.S. Cl. .................................... 374/179; 136/221; 136/226; 136/230; 374/208
[58] Field of Search ................. 374/179; 136/230, 228, 136/221, 225, 226

[56] References Cited

U.S. PATENT DOCUMENTS

| | | | |
|---|---|---|---|
| 1,610,271 | 12/1926 | Evins | 136/230 X |
| 3,151,484 | 10/1964 | Feehan et al. | 136/230 X |
| 3,407,097 | 10/1968 | Engelhand | 136/228 X |
| 4,241,289 | 12/1980 | Bowling | 136/230 X |
| 4,410,756 | 10/1983 | Schwagerman | 374/208 |

Primary Examiner—Daniel M. Yasich
Attorney, Agent, or Firm—Daniel T. Anderson

[57] ABSTRACT

Thermocouple apparatus is disclosed, utilizing interlocked loops of dissimilar wire. Base means, spring mounted, are provided for tensioning the loops whereby their point of interlock, in compression, forms a non-metallurgically bonded thermocouple junction. The end of each loop opposite its interlocked end is electrically connected by similar-metal means to a meter unit.

4 Claims, 6 Drawing Sheets

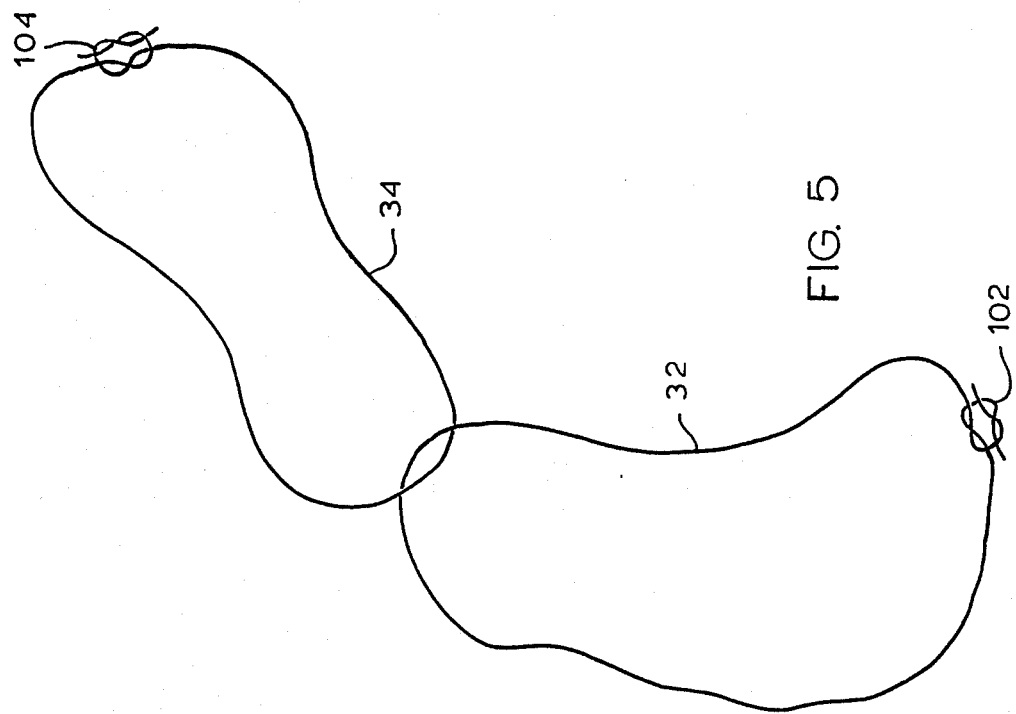
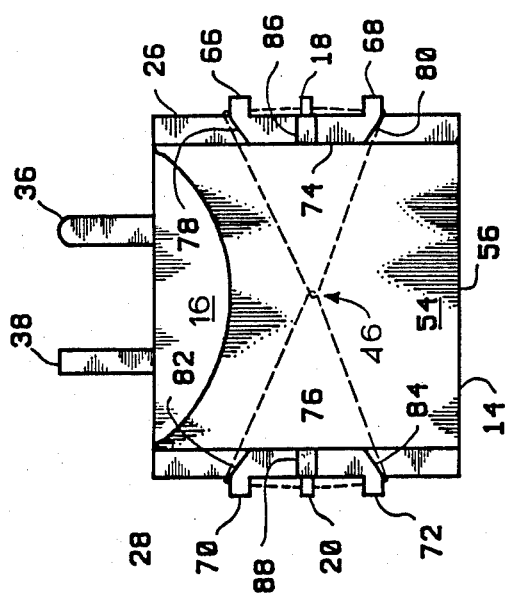

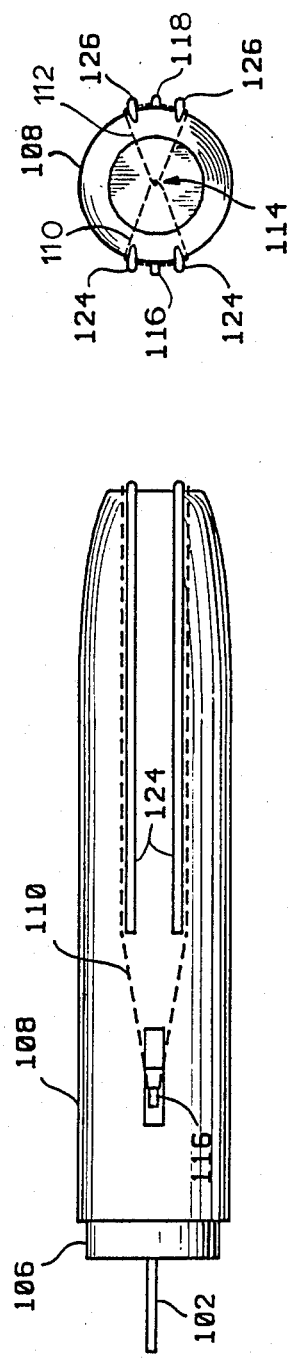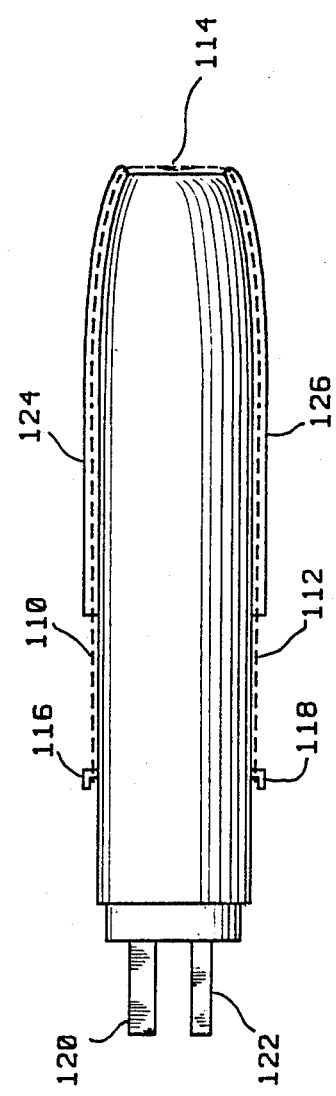

TEMPERATURE MEASURING APPARATUS

BACKGROUND OF THE INVENTION

This invention relates generally to temperature measurment and more particularly to instruments including improved thermocouple transducer apparatus.

At the current state of the art when it is desired to measure temperatures below approximately 300 degrees fahrenheit (149 degrees celsius) there are very accurate and conveniently linear temperature-voltage transducers available. These generally utilize semiconductor devices with associated sophisticated electronic circuitry. However, above such temperatures, the limitations of these transducers significantly compromise their accuracy, reliability, or longevity; and the practicioner must generally choose between three other types of transducers:infrared sensors, resistance temperature detectors, or thermocouples.

Infrared sensors are expensive, complex, bulky, and require special skills in their effective operation. Resistance temperature detectors, for high temperatures, generally require a relatively large amount of expensive platinum. The mass of the platinum is very costly and inherently has a great deal of thermal inertia, thus limiting its response speed and effective sensitivity.

The thermocouple option utilizes the phenomenon of joining dissimilar metals and generating at the junction an electromotive force which is a reliable function of its temperature. Difficulties in the past included 1. the need for maintaining the "reference" junction (where the other ends of the dissimilar metals are effectively rejoined) very accurately at a known constant, or compensable, temperature and 2. converting the highly nonlinear thermocouple response to a usefully linear function. These difficulties fortunately are very satisfactorily solved at present by electronic means.

There have remained, however, other serious difficulties and limitations in the thermocouple art stemming from the physical aspects of the manufactured junction. The two metals must, of course, be held in electrical contact with each other. When they are so held together by welding techniques, the manufacture is complex and often difficult or requires very special skills. Further the resulting junction may be brittle or otherwise weakened by the process; or it may be metallurgically changed by alloying or contamination by the welding materials or absorbed atmosphere. In addition, the welding matetial may "wick" or diffuse along the thermocouple materials thereby enlarging, displacing, or otherwise affecting the junction, all of these effects being aggravated by the necessity of working with metals having inherently dissimilar natures.

When the thermocouple is bonded by solder, it is temperature limited and relatively weak. And, again, a third metal is added to the metallurgically combination which may, in particular cases cause deleterious effects.

Most important, when an additional material is used to manufacture the junction, additional mass is added which inherently compromises the sensitivity and response speed of the junction.

It is, accordingly, an object of present invention to provide thermocouple apparatus which does not suffer the above and other limitations and disadvantages of the prior art.

It is another object to provide such apparatus which is very inexpensive, mechanically simple, and reliable, and which provides a rugged thermocouple of great strength and durability.

It is another object to provide such apparatus which incorporates no additional material at the junction and which in some embodiments utilizes no metallurgical bonding in the manufactured junction.

It is another object to provide such apparatus which is extremely sensitive and extremely low in thermocouple mass.

SUMMARY OF THE INVENTION

Briefly there and other objects are achieved in accordance with the principles of the invention as embodied in a presently preferred example thereof by providing a thermocouple transducer comprising a pair of interlocked rings of dissimilar metal wire. The rings may each be formed by tying together, as by a square knot, the ends of a length of desired wire. Additional means is provided for holding the loops, as a unit, in tension so that the point of interlocking forms a metal to metal thermocouple contact. The loops are held to the tensioning means by hooks whereby they may be readily removed or replaced when desired. The hooks, in metallic composition, match their respective wire loops and the transducer terminals and leads to the meter whereby no parasitic thermocouple junctions or connections are formed outside of the circuitry of the meter. These and other objects and advantages as well as the construction and operation of the invention will be best understood from a consideration of the following drawings and detailed description.

DESCRIPTIVE LIST OF THE DRAWINGS

FIG. 4 is a top, plan view of the structure of FIGS. 1 and 2;

FIG. 5 is a plan view of a pair of interlocked wire loops;

FIG. 7 is a plan view of an alternative example of the invention;

FIG. 8 is a side elevational view thereof;

FIG. 9 is an end elevational view thereof; and

DESCRIPTION OF PREFERRED EMBODIMENT

Figure 1:
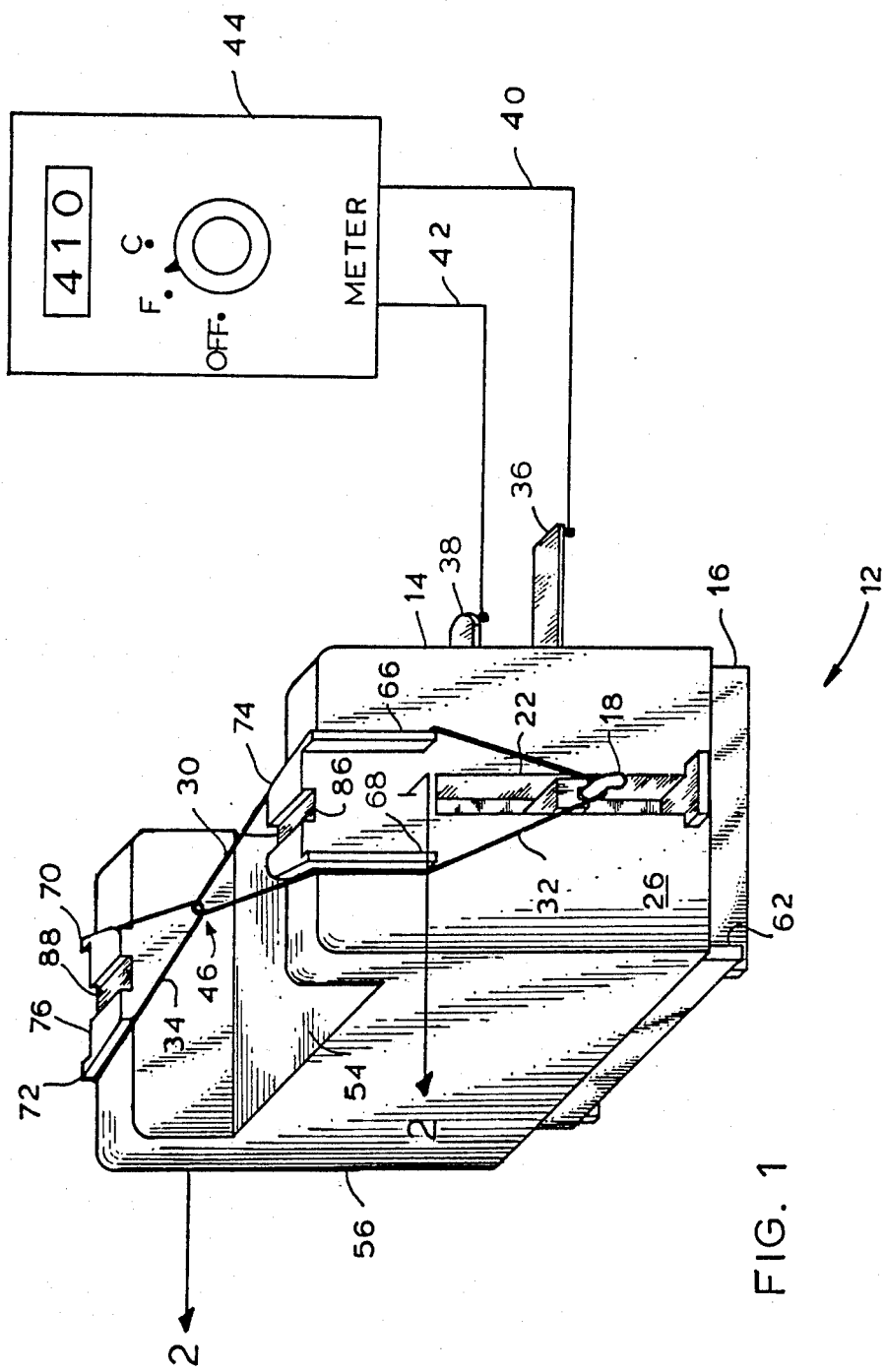
FIG. 1 is a partially perspective, partially electrically schematic view of thermocouple meter apparatus constructed in accordance with the principles of the present invention.

In FIG. 1 a thermocouple transducer 12 is illustrated which includes an outer body member 14 telescopically housing a base member 16. Electrode retainer hooks 18, 20 are carried by the base member 16 and project symmetrically out through respective access slots 22, 24, formed in the sides 26, 28 of the outer body member 14. Each of the retainer hooks holds an opposite end of an interlocked pair 30 of thermocouple wire loops 32 and 34. The loops are metallically dissimilar with, for example, loop 32 being alumel and loop 34 being chromel. The hooks 18 and 20 are made of the same metal as their respective thermocouple wire loops. In addition each hook is formed integrally with its respective output terminal prong 36, 38; and the conductors 40, 42 connecting the transducer 12 to the circuitry of the meter 44 are also all appropriately matched whereby there are no parasitic thermocouple junctions between the sensing thermocouple 46, formed at the interlocking point of the two wire loops, and the meter circuit that is, the total connective means from each side of the thermocouple 46 to its respective meter terminal is composed of metallurgically similar conductors.

Figure 3:
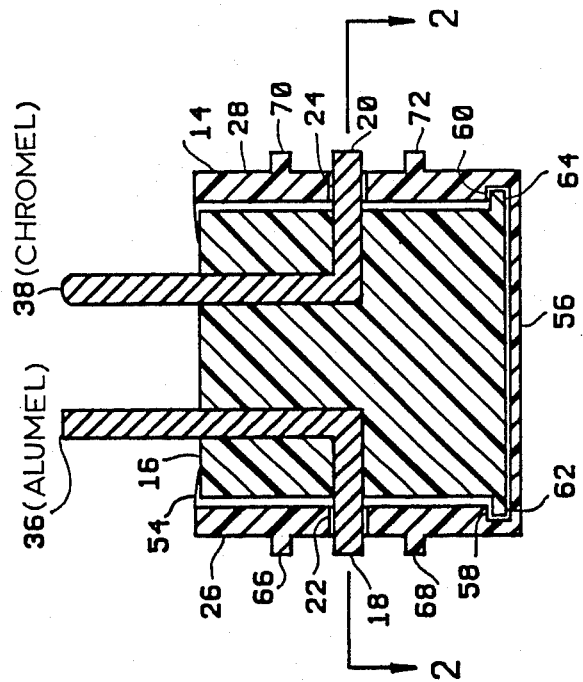
FIG. 3 is a cross-sectional view of the structure of FIG. 2 taken along the reference lines 3—3 thereof.
Figure 2:
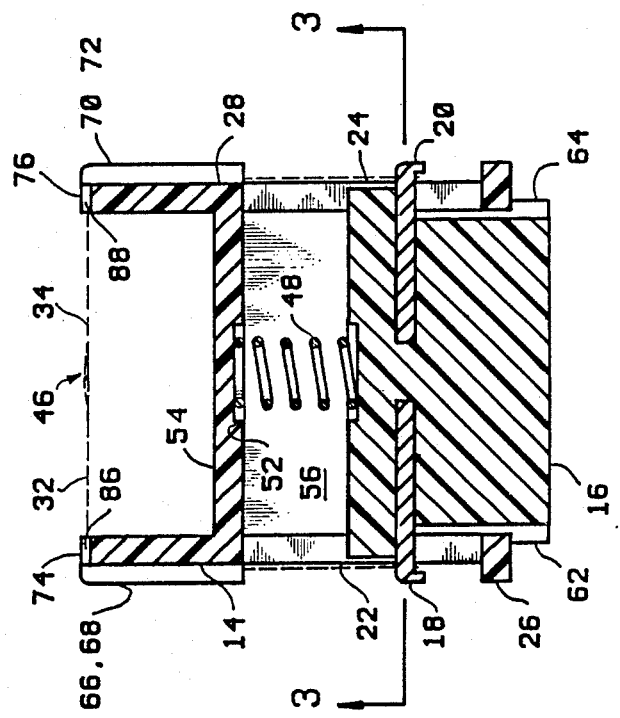
FIG. 2 is a sectional view of the structure of FIGS. 1 and 3 taken as indicated by the reference lines 2—2 thereof.

Referring to FIGS. 2 and 3 the telescopic relation of the base member 16 with respect to the outer body member 14 is shown. A compression spring 48 axially tends to force the two body portions apart thus holding the interlocked thermocouple wire loops 32, 34 in tension. The wire of the loops may be chosen to have a diameter of from 0.0005 to 0.050 or more inches; accordingly the strength, spring constant, of the spring 48 is desireably selected to optimize the tension in the wires against the risk of breaking them during use. A circular, spring retaining shoulder 50 is provided on the top of the inner base member 16 and cooperates with a retaining depression 52 in the bottom of upper shelf member 54 of the outer body member 14 to retain compressively the spring 48.

The lower portion of the outer body member 14 is seen to comprise essentially the sides 26, 28 and a rear wall 56 which together retain the inner base member 16. To retain it and to guide the vertical, axial, telescopic movement of the base member 16 within the outer member 14, a set of grooves 58, 60 are formed one each in the walls 26, 28 adjacently to the rear wall 56. The rear portion of the base member 16 is extended laterally to form lands 62, 64 which slidingly engage the grooves 58, 60 and thereby provide the desired sliding guidance between the members. It may be noted that in practice the inner base member 16 may be fabricated from two pieces, not shown separately, to aid in assembly with the hooks 18, 20 protruding through their respective slots 22, 24 in the sides of the outer member 14.

Note that the body 14 of the transducer 12 forms essentially a probe with the thermocouple junction held in tension and spaced apart from the central (or upper shelf member 54) portion of the transducer. By this means, the actual thermocouple may be effectively thermally isolated from the body of the transducer and placed in contact with the object or material whose temperature is to be measured. In some instances, for example, the object being measured may be a heated instrument or tool; in other instances, the "object" may be a bath or stream of liquid or gas.

FIG. 3 also particularly illustrates that the hooks 18, 20 are each, respectively, formed integrally with one of the terminal prongs 36, 38.

Referring to FIGS. 1 through 4 and 6, a system of wire guiding ridges and slots associated with the outer body member 14 is illustrated. On the side walls 26, 28 are formed a pair of vertical ridges 66, 68 and 70, 72 respectively. The center portion 74, 76 of the top of the sides 26, 28, respectively, is extended upwardly to form retaining shoulders 78, 80 and 82, 84 which cooperate with the ridges to retain and guide the wire loops 32, 34. A central slot 86, 88 is formed as shown in respective ones of the center portions 74, 76 to form an additional set of wire or ribbon retaining grooves.

Figure 6:
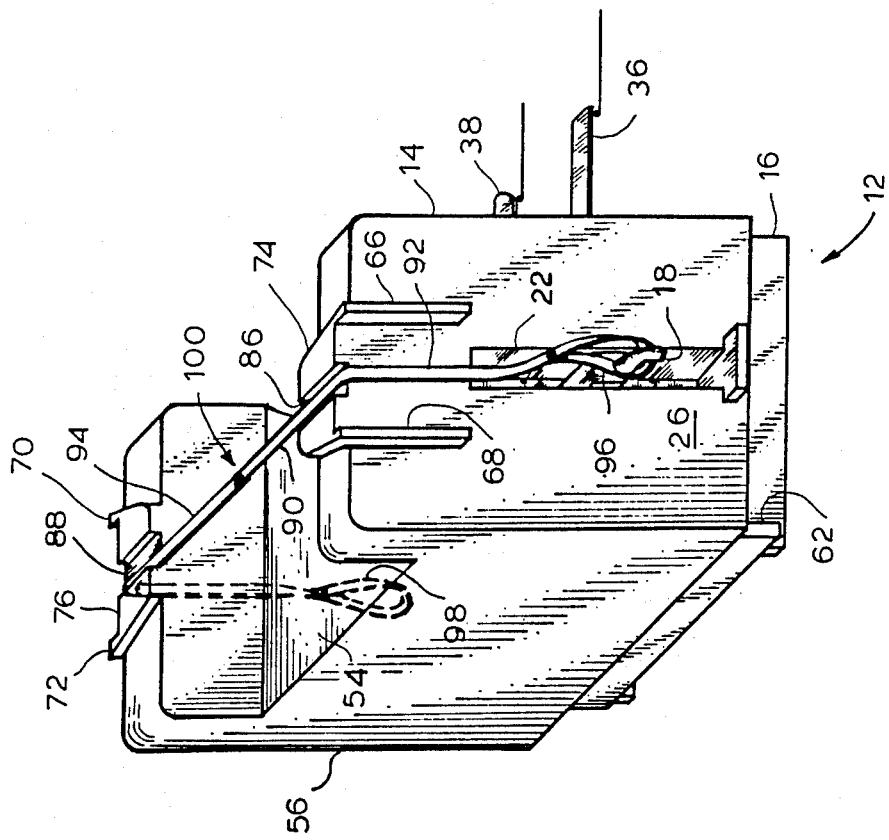
FIG. 6 is a view like that of FIG. 1 illustrating an alternative example of a thermocouple junction.

Referring to FIG. 6, an example of a tensioned thermocouple ribbon 90 is illustrated which includes a segment 92 of alumel and a segment 94 of chromel, each formed with a spot welded end loop 96, 98, respectively, and spot welded at their junction to form a thermocouple 100. The composite ribbon is shown fitted through the central slots 86, 88 and hooked over the retainer hooks 18, 20 to provide the desired tension.

In FIG. 5, the manufacture of the interlocked thermocouple wire loops is indicated. A length of alumel wire is tied in a loop with an appropriate tie such as a square knot 102; while a similar length of chromel wire is interlockingly tied in a loop 34 through the loop 32. The knots 102, 104 may be secured with a globule of tin solder, not shown, when desired. It has also been found advantageous to apply a short length of colored shrink tubing over the joint to secure it and to provide a ready means of identifying the particular alloy of the wire loop.

In FIGS. 7, 8 and 9 an example of the invention in the form of a probe is illustrated. As in the previous example, the transducer includes a telescopically related pair of inner and outer body members 106, 108 with an internal spring, not shown, tending to extend the members axially apart, but resisted by the tension in an interlocked pair of thermocouple wire loops 110, 112. The wire loops, as above, form a thermocouple 114 at their compressed point of interlocking at the forward end of the probe and are held by hooks 116, 118, respectively, carried by the inner member 106. Each hook metallurgically matches its respective wire loop and is formed integrally with a respective terminal prong 120, 122. The wire loops are guided and retained by sets of ridges 124, 126 formed on the molded outer body member 108.

Figure 10:
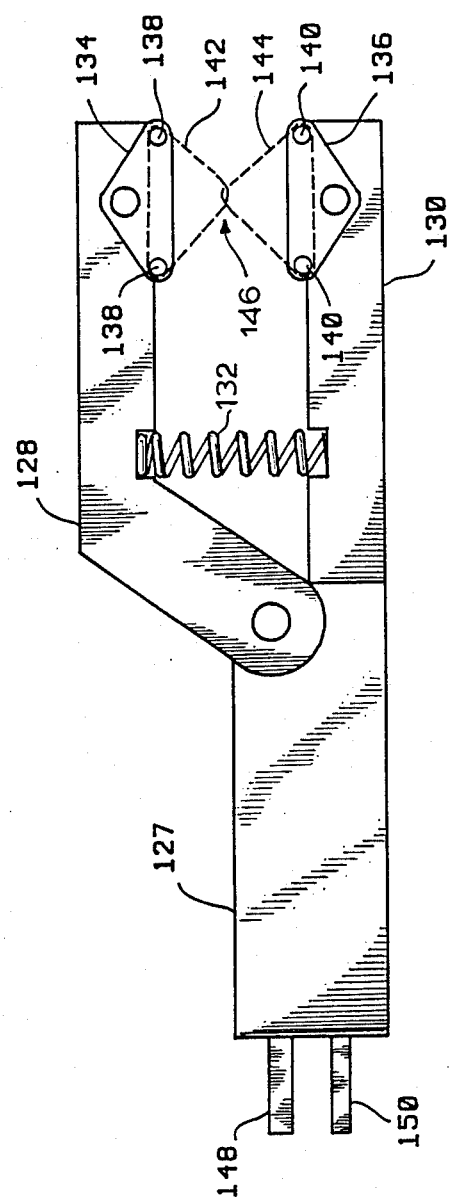
FIG. 10 is plan view of another, alternative example of the invention.

In FIG. 10 an alternative tranducer probe 127 is illustrated in which a pair of pivotally connected legs 128, 130 are stressed apart by a compression spring 132 interposed between the legs as shown. Near the end of each leg, an arm 134, 136 is pivotally attached in a juxtaposed relation with each other. Each arm is provided with a respective pair 138, 140 of spaced apart retaining hooks for cooperatively holding an interlocked pair of thermocouple wire loops 142, 144. The loops are held in tension by the spring 132 and form a compressed thermocouple junction at 146. As above, each loop and its retaining hooks are connected by wires not shown, to a respective terminal prong 148, 150 and thence to an appropriate meter 44, all by metallurgically matched metals. The pivotal mounts of the arms 134, 136 permits an automatic stress relief, or equalization, of the wire loops 142, 144.

Referring to FIG. 1, it is advantageous to mirror finish the upper surface of the shelf 54 as an aid in the precision placement of an object with respect to the thermocouple junction 46.

In operation, it is apparent that with the selection and installation of very fine thermocouple wire in the loops of any of the above examples, a transducer of extreme sensitivity with extremely rapid response is readily feasible. Transducers constructed as shown have been used to measure the temperature of the flow of air with great accuracy and rapidity.

It may be noted that a particularly advantageous use for the transducers described herein is in the soldering art wherein soldering instrument temperatures or that of soldering hot air jets must be determined and the tools calibrated. It has been noticed that soldering and desoldering materials tend to collect at the thermocouple junction where the instruments hot tip is contacted by the transducer. The foreign matter is, however, automatically cleaned from the junction by the slight relative motion of the interlocked wire loops as they are contacted and pressed by the object being tested: the slight relative motion causes a scrubbing action between the wires which achieve this cleaning and maintains and preserves the good electrical contact between them.

Other advantages not explicitly set forth above include being able to change the thermocouple wire essentially instantly merely by compressing the tensioning spring and removing the wire loops from their hooks. It may be noted that in so doing there are no parts of the transducer body left free to pop-out from the assembly. It may also be noted that the wire loops are self centering and require no precision placement with respect to their junction or their disposition on the hooks. It may be pointed out, in this same regard, that at any time, when desired, either loop may be rotated, independently of the other, to provide a new thermocouple point.

There have been disclosed and described different examples of a novel thermocouple transducer which exhibits these and other advantages as well as those discussed earlier above. The disclosed measurment apparatus also achieves the objects as set forth hereinabove.

What is claimed is:

1. Temperature measurement apparatus comprising:
   a transducer body having a measurement end and thermocouple wire supporting sides oppositely disposed with respect to each other;
   a pair of interlocked, metallically dissimilar wire loops being in a single point of interlocked contact contiguous to said measurement end of said body and being disposed in contact with a respective one of said wire supporting side;
   wire guide means carried by said supporting sides for holding said wire loops in a predetermined disposition along said sides and with respect to said measurement end; and
   wire loop tensioning means including spring means and hooks coupled thereto carried by said body and attached to the ends of said interlocked loops oppositely from their said point of contact to hold said loops in tension and said point of contact in compression.

2. Temperature measurement apparatus as set forth in claim 1 in which said wire guide means is of the character holding said wire loops in a crossed configuration in a plane juxtaposed over said measurement end of said transducer body.

3. Temperature measurement apparatus as set forth in claim 1 which further includes meter means connected to said wire loops and in which the total connective means from each said loop to said meter is of metallurgically similar metal.

4. Temperature measurement apparatus as set forth in claim 1 in which one of said metallically dissimilar wire loops is composed of the alloy chromel and the other of the alloy alumel.

* * * * *